United States Patent [19]
Forsyth et al.

[11] Patent Number: 5,788,037
[45] Date of Patent: Aug. 4, 1998

[54] INTEGRATED CLUTCH TRANSMISSION

[75] Inventors: John R. Forsyth, Romeo; Larry A. Pritchard, Sterling Heights, both of Mich.

[73] Assignee: New Venture Gear, Inc., Troy, Mich.

[21] Appl. No.: 687,010

[22] Filed: Jul. 16, 1996

[51] Int. Cl.$^6$ .............................. F16D 13/52; F16D 13/72
[52] U.S. Cl. ........................... 192/70.12; 192/70.17; 192/70.28; 192/113.23; 192/113.34
[58] Field of Search ................. 192/70.17, 70.12, 192/70.28, 113.34, 113.21, 113.23, 112

[56] References Cited

U.S. PATENT DOCUMENTS

| | | | |
|---|---|---|---|
| 969,577 | 9/1910 | Vollmer | 192/112 X |
| 1,912,004 | 5/1933 | Matthews | 192/70.17 X |
| 2,632,543 | 3/1953 | Wilson | 192/112 X |
| 3,581,855 | 6/1971 | Taeffner et al. | 192/113.23 X |
| 4,301,904 | 11/1981 | Ahlen | 192/70.12 |
| 4,540,077 | 9/1985 | Yamamoto et al. | 192/113.34 X |
| 4,844,219 | 7/1989 | Stockmar | 192/70.28 X |
| 4,923,043 | 5/1990 | Okuno | 192/70.12 |
| 5,016,743 | 5/1991 | Kajino | 192/70.12 |
| 5,597,059 | 1/1997 | Gebauer et al. | 192/113.23 X |
| 5,617,940 | 4/1997 | Fukushima et al. | 192/70.17 |

*Primary Examiner*—Rodney H. Bonck
*Attorney, Agent, or Firm*—Harness, Dickey & Pierce, P.L.C.

[57] ABSTRACT

A damper and clutch assembly is provided having a damper mechanism for providing a dampened connection to an engine output shaft and having an inertia member connected thereto. A multi-disc clutch mechanism is also drivingly connected to the damper mechanism. The clutch mechanism includes a plurality of drive plates connected to a drive drum, a plurality of driven plates connected to a driven drum and an inertia member connected to the drive drum. The damper and clutch assembly is integrated into the housing of a manual shift automotive transmission and is provided with a forced air cooling system and an inside to outside lubrication system.

16 Claims, 7 Drawing Sheets

INTEGRATED CLUTCH TRANSMISSION

BACKGROUND OF THE INVENTION

1. Field of the Invention

The present invention relates generally to damper and clutch assemblies for manual automotive transmissions and, more specifically, to a integrated clutch transmission having a dual inertia mass designed with a multiple disk wet clutch integrated in the transmission housing.

2. Description of Background Art

Most manual shift automotive transmissions are equipped with a flywheel which is attached to the engine output shaft. A clutch assembly is provided adjacent to the flywheel for normally providing a friction coupling between the flywheel and a driven plate attached to the transmission input shaft. In particular, the clutch assembly is engaged by a pressure plate which urges the driven plate into frictional contact with the flywheel for causing the driven plate to rotate in common with the flywheel. As is known, a manually-operable clutch release mechanism is provided for permitting the vehicle operator to selectively disengage the clutch assembly by releasing the pressure applied to the driven plate by the pressure plate. A clutch cover is provided separate from the transmission housing and is typically mounted thereto to cover the clutch assembly and clutch release mechanism. As the clutch release mechanism is actuated, the frictional contact between the flywheel and the driven plate is relieved and the flywheel is free to rotate relative to the driven plate. Release of the frictional contact between the flywheel and the driven plate allows the manual transmission to be shifted to a higher or lower gear ratio and allows the vehicle to be stopped without stalling the engine.

Conventional clutch assemblies are designed to be installed on the engine output shaft prior to assembly of the manual transmission. As such, assembly of the clutch assembly and manual transmission requires several more steps at the assembly plant than would be required if the clutch assembly were integrated with the transmission. Accordingly, it is desirable to provide an integrated clutch transmission which could be coupled directly to a drive plate, similar to the assembly of automatic transmissions with a torque converter.

Another problem with conventional clutch assemblies used with manual transmissions is that the clutch assembly includes a single driven plate which provides all of the frictional contact with the flywheel and the pressure plate. Accordingly, the single driven plate is highly susceptible to excessive wear and may require several replacements during the normal service life of the motor vehicle.

As such, a need exists to develop alternatives to conventional manually-operable clutch assemblies that provide solutions to the above-noted problems.

SUMMARY OF THE INVENTION

Accordingly, it is the object of the present invention to provide an integrated clutch transmission which can be attached to the engine output shaft with a reduced number of assembly steps as compared to conventional manual shift transmission and clutch assemblies.

A further object of the present invention is to provide a combination damper and clutch assembly for a manual shift automotive transmission having a multi-disc wet clutch.

It is a further object to provide the combination damper and clutch assembly with a forced air cooling system.

Still another object of the present invention is to provide the combination damper and clutch assembly with a dual-inertia mass arrangement which provides a first inertial mass on an upstream side of the damper mechanism and a second inertial mass on a downstream side of the damper mechanism.

It is yet another object of the present invention to provide a multi-disc clutch assembly for a manual shift automotive transmission which is provided with means for obtaining proper spacing between the clutch plates when the clutch release mechanism is actuated.

Still another object of the present invention is to provide an integrated clutch transmission assembly having the above-noted features and yet which is simple in structure, inexpensive to manufacture, easy to mass produce and durable in use.

These and other objects of the present invention are obtained by providing a damper and clutch assembly having a damper mechanism for providing a dampened connection to the engine output shaft and having a first inertial member connected thereto. A multi-disc clutch mechanism is also drivingly connected to the damper mechanism. The clutch mechanism includes a plurality of first clutch plates connected to a drive drum, a plurality of second clutch plates connected to a driven drum, and a second inertial member connected to the drive drum for providing the drive drum with inertia when the clutch mechanism is disengaged, such that the drive drum is driven smoothly by the damper mechanism and the inertia member connected to the drive drum.

The objects of the present invention are also obtained by providing an integrated clutch transmission including a transmission housing; a drive plate rotatably supported by and adapted to be connected to an engine output shaft; a first inertia member mounted to the drive plate; a clutch damper having at least one drive damper plate connected to the drive plate and a driven damper plate connected to the at least one damper drive plate by a plurality of springs; a multi-disc clutch having an outer drum supporting a plurality of drive plates and which is drivingly connected to the driven damper plate, and an inner drum connected to an output shaft and supporting a plurality of clutch plates that are alternately interleaved with the drive plates; a second inertia member mounted to the outer drum of the multi-disc clutch; a pressure plate adjacent to the multi-disc clutch; a biasing mechanism for exerting a biasing force on the pressure plate; and a clutch release mechanism for selectively releasing the biasing force from the pressure plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
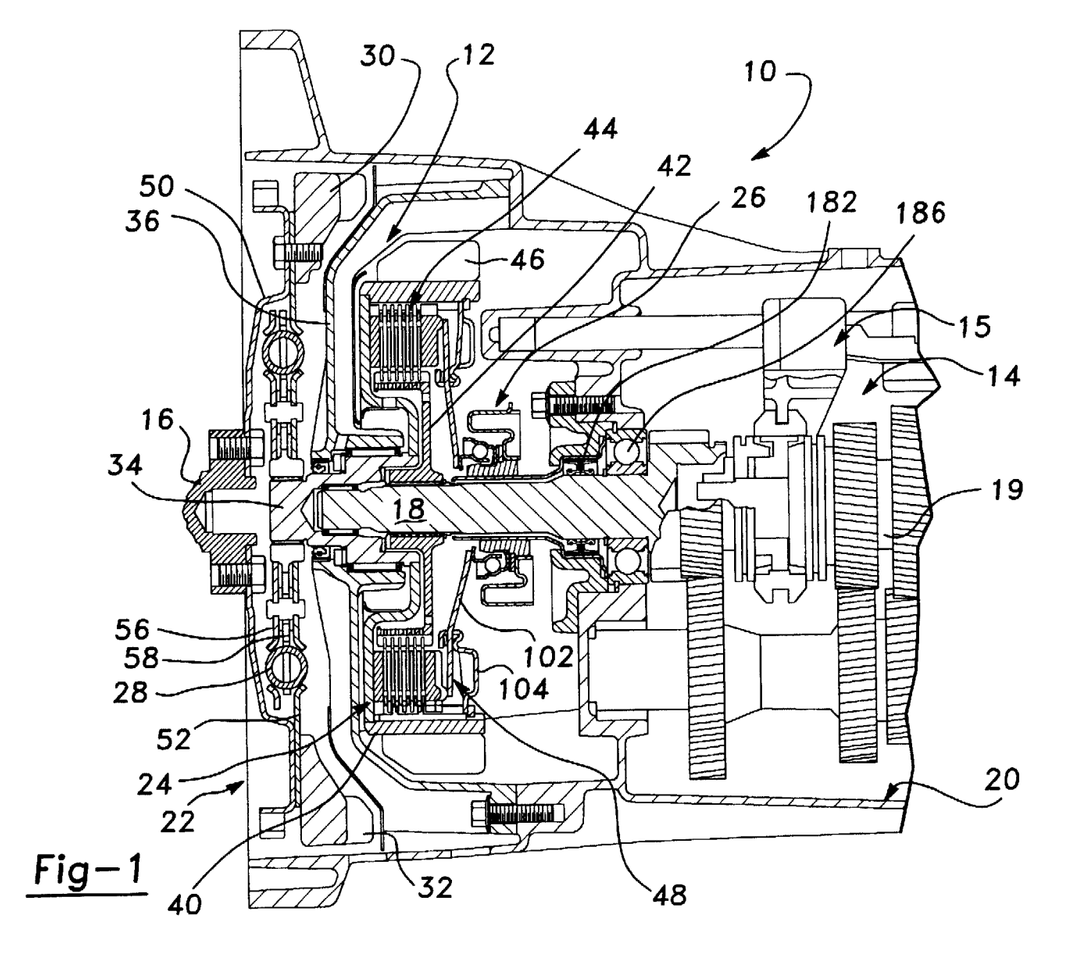
FIG. 1 is a cross-sectional view of an integrated clutch transmission including a damper and clutch assembly according to the principles of the present invention.

In general, the present invention relates to an integrated clutch transmission 10 and includes a damper and clutch assembly 12 combined or integrated into a common housing with a multi-speed gearset 14 of the manual shift variety. Damper and clutch assembly 12 is operably connected between an engine output shaft 16 and an input shaft 18 of multi-speed gearset 14. Integrated clutch transmission 10 includes a transmission housing 20 which houses both damper and clutch assembly 12 and multi-speed gearset 14. As noted, multi-speed gearset 14 is of the manual shift-type that is operable to be shifted under the control of the vehicle operator between a neutral, a reverse, and a plurality of forward gear ratios for driving an automotive vehicle. A portion of an exemplary shift mechanism 15 is shown which is connected to a gearshift lever (not shown) under the control of the vehicle operator for selectively coupling a transmission output shaft 19 to input shaft 18 to establish the desired gear ratio. While the specific construction of multi-speed gearset 14 is not of any significant importance to the novelty of the present invention, those skilled in the art will understand that any conventional RWD transmission or FWD transaxle arrangement is fairly included in the scope of this invention.

In general, damper and clutch assembly 12 includes a damper mechanism 22, a clutch mechanism 24, and a clutch release mechanism 26 that are arranged to normally provide a rotary drive connection between engine output shaft 16 and transmission input shaft 18. Damper mechanism 22 includes a plurality of springs 28 for absorbing vibration that would ultimately be transferred from engine output shaft 16 to transmission input shaft 18. A first or initial inertia member 30 is mounted on damper mechanism 22. Initial inertia member 30 is a ring-like member operable to provide rattle control by providing a balanced inertial mass to damper mechanism 22 for maintaining a constant rotational speed. An air impeller 32 is connected to initial inertia member 30 for driving cooling air through transmission housing 20 in the area around damper and clutch assembly 12. Damper mechanism 22 connects engine output shaft 16 to an intermediate shaft 34 which is rotatably supported within a central opening of a clutch cover 36.

As will be detailed, clutch mechanism 24 is operable for releasably coupling input shaft 18 for driven rotation with intermediate shaft 34. In the embodiment shown, clutch mechanism 24 is a multi-plate wet clutch having an outer drum 40 fixed for rotation with intermediate shaft 34, an inner drum 42 fixed for rotation with input shaft 18, and a multi-disc clutch pack 44 operably installed therebetween. In addition, a second or final inertia ring 46 is shown mounted to outer drum 40. Final inertia ring 46 also provides rattle control by providing a balanced inertial mass to outer drum 40 for maintaining a relatively constant rotational speed. A spring-biased thrust mechanism 48 acts on clutch pack 44 for normally maintaining clutch mechanism 24 in an "engaged" mode. Clutch release mechanism 26 is operable for selectively shifting multi-plate wet clutch 24 into a "released" mode. Clutch release mechanism 26 can be of any known design, a few of which will be described in greater detail hereinafter.

Figure 2:
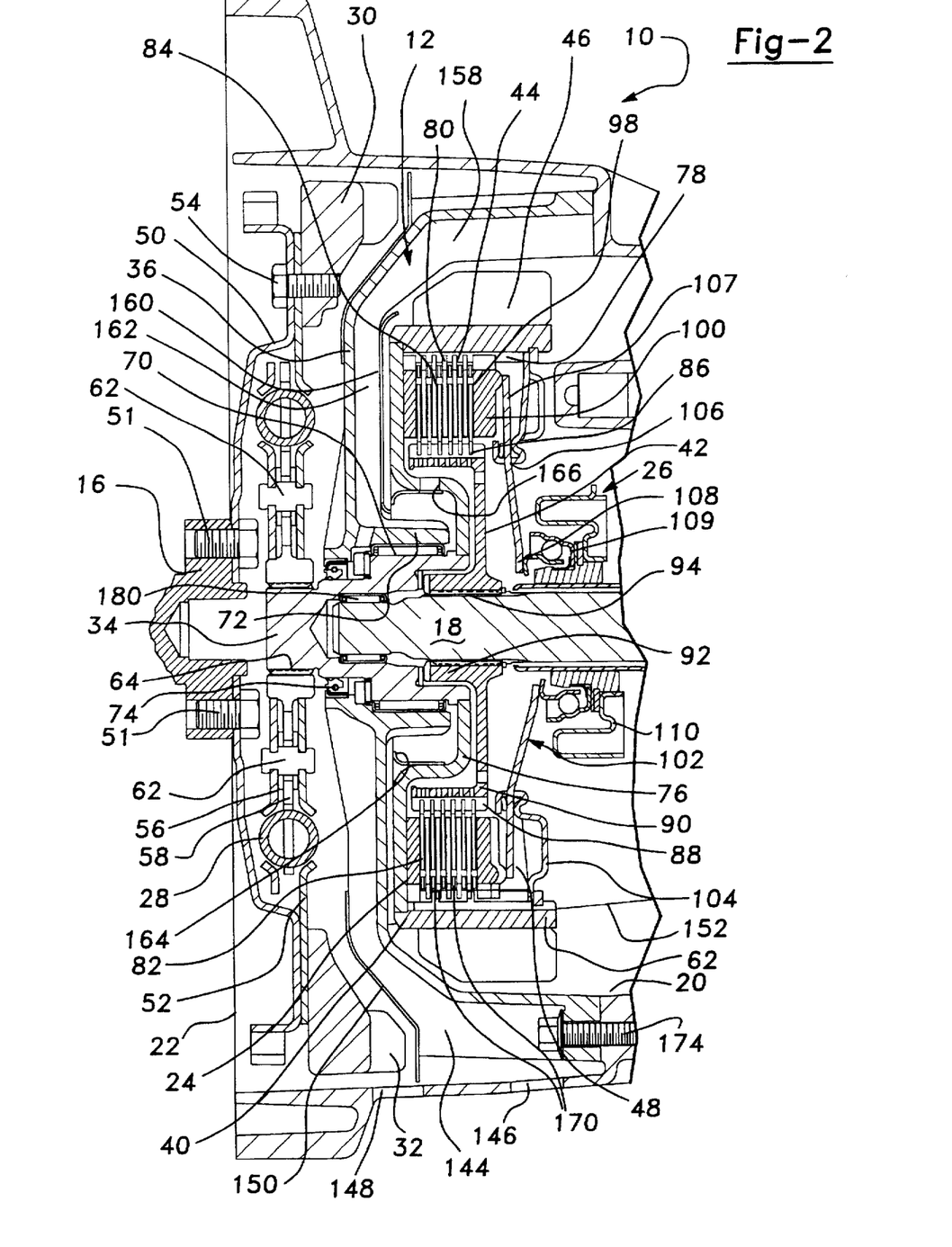
FIG. 2 is an enlarged partial view of FIG. 1.

With particular reference to FIG. 2, the various components of damper and clutch assembly 12 will now be described in greater detail. Damper mechanism 22 includes a drive plate 50 connected to engine output shaft 16 by bolts 51. Drive plate 50 is connected to a first drive damper plate 52 and first inertia member 30 by bolts 54. Air impeller 32 includes a plurality of blades extending from first inertia member 30. Air impeller 32 can be integrally formed with first inertia member 30 or can be assembled on first inertia member 30, drive plate 50 or first drive damper plate 52. First drive damper plate 52 is supported along with a second drive damper plate 56 by a driven damper plate 58. Springs 28 interconnect first and second drive damper plates 52 and 56 with driven damper plate 58. Moreover, a plurality of connecting members 62 interconnect the laterally-spaced first and second drive damper plates 52 and 56, respectively, with driven damper plate 58 and limit rotation of first and second drive damper plates 52 and 56 relative to driven damper plate 58. Driven damper plate 58 is coupled via a splined connection 64 to intermediate shaft 34.

Intermediate shaft 34 is rotatably supported by needle bearings 70 in an annular hub portion 72 of clutch cover 36. A lubricant seal 74 is also provided between intermediate shaft 34 and clutch cover 36. Multi-plate wet clutch 24 is located adjacent to clutch cover 36. Multi-plate wet clutch 24 includes a clutch housing 76 which is connected (i.e., welded, splined, etc.) to intermediate shaft 34 for rotation therewith. Clutch housing 76 is connected (i.e., welded, splined, etc.) to outer clutch drum 40 which has an internally-splined surface 78 that is engaged by external splines 80 of drive plates, hereinafter referred to as outer clutch plates 82. In addition, second inertia ring 46 is attached to outer clutch drum 40 by any known means. It should also be understood that first inertia member 30 and second inertia ring 46 do not need to be a continuous ring, instead they could be formed with several mass portions that are spaced around drive plate 50 and outer clutch drum 40, respectively, so as to be properly balanced.

Multi-plate wet clutch 24 is also shown to include a plurality of driven plates, hereinafter inner clutch plates 84, that are alternately interleaved with outer clutch plates 82 and which have internal splines 86 meshingly engaged with external splines 88 formed on inner drum 42. Thus, outer clutch plates 82 and inner clutch plates 84 are operatively arranged to define clutch pack 44. Inner drum 42 has an outer hub 90 on which splines 88 are formed and an inner hub 92 coupled via a splined connection 94 to input shaft 18. In addition, a plurality of separator springs 98 are provided between outer clutch plates 82 in order to minimize drag. Thrust mechanism 48 of multi-plate wet clutch 24 includes a pressure plate 100 that is located adjacent to interleaved clutch plates 82 and 84 for axial movement relative thereto. Pressure plate 100 is releasably pressed into an "engaged" position by a diaphragm spring 102 which is supported by a cover member 104. Cover member 104 is shown to include a pivot 106 about which diaphragm spring 102 can be resiliently deflected. With pressure plate 100 in its engaged position, it exerts a compressive clutch engagement force on interleaved clutch pack 44 for preventing relative rotation therebetween, thereby locking inner drum 42 for concurrent rotation with outer clutch drum 40. With inner drum 42 rotatably driven by outer drum 40, wet clutch 24 is defined as operating in its normally engaged mode, whereby transmission input shaft 18 is rotatably driven at a common speed with engine output shaft 16.

In general, clutch release mechanism 26 is provided for selectively causing wet clutch 24 to be shifted from its engaged mode into its release mode to permit the vehicle operator to shift between the available gear ratios. More particularly, clutch release mechanism 26 is operable for engaging a radially-inward portion 108 of diaphragm spring 102 such that forward axial movement of clutch release mechanism 26 (i.e., to the left, as shown in FIG. 2) causes a radially-outer portion 107 of diaphragm spring 102 to resiliently pivot about pivot 106 for moving pressure plate 100 to a "released" position. With pressure plate 100 in its released position, the clutch engagement force is removed from clutch pack 44 which, in turn, allows inner clutch plates 84 to rotate relative to outer clutch plates 82. In the embodiment shown in FIG. 1, clutch release mechanism 26 includes a sliding bearing assembly 109 that engages radially-inward portion 108 of diaphragm spring 102 and is axially movable in response to axial movement of a conventional shift fork 110 (partially shown). While not shown, shift fork 110 is conventionally connected to a spring-biased lever which, in turn, is connected to a cable assembly that is movable in response to movement of a clutch pedal by the driver of the motor vehicle.

Figure 3:
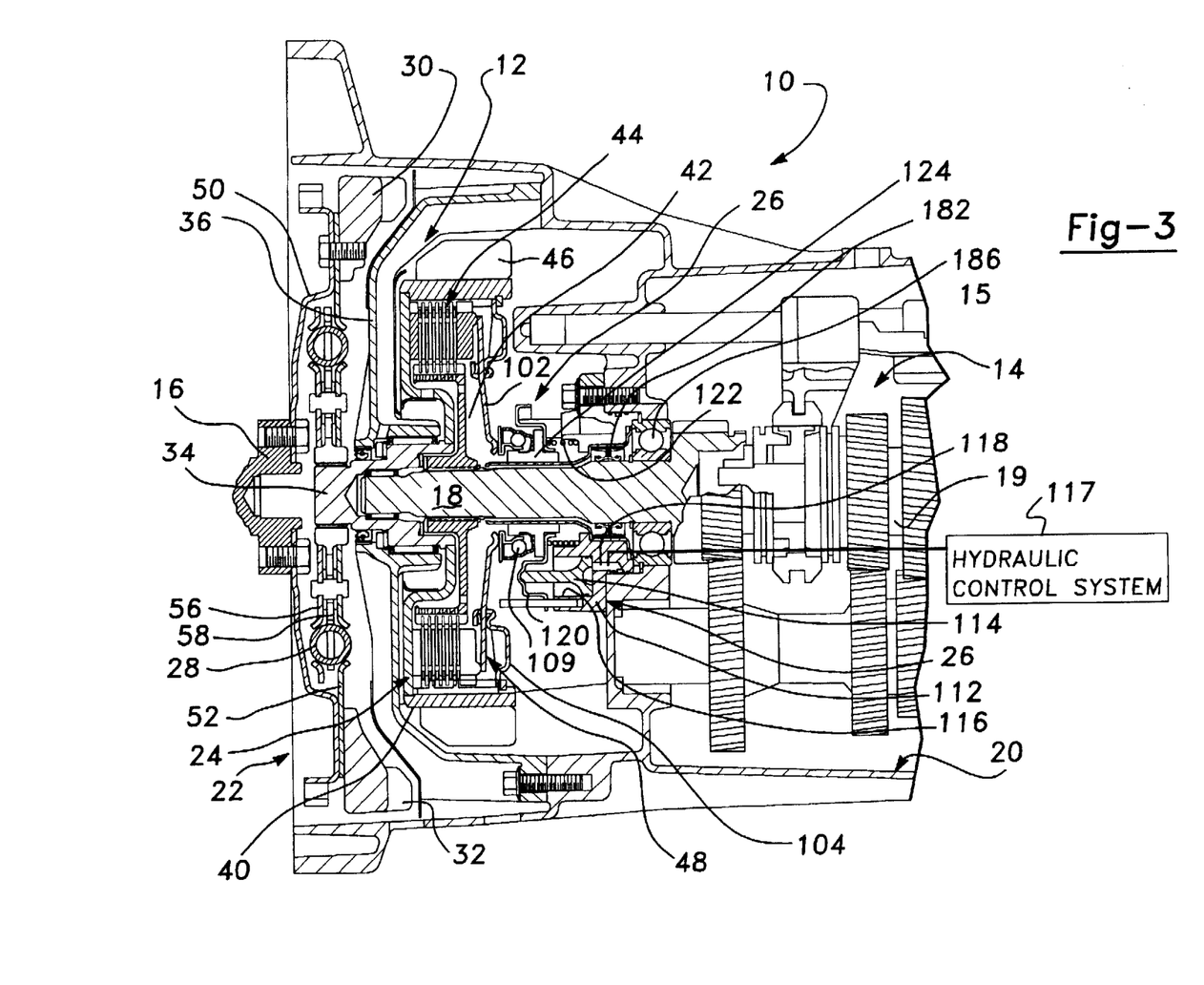
FIG. 3 is a cross-sectional view of the integrated clutch transmission equipped with a clutch release mechanism according to a second embodiment of the present invention.
Figure 4:
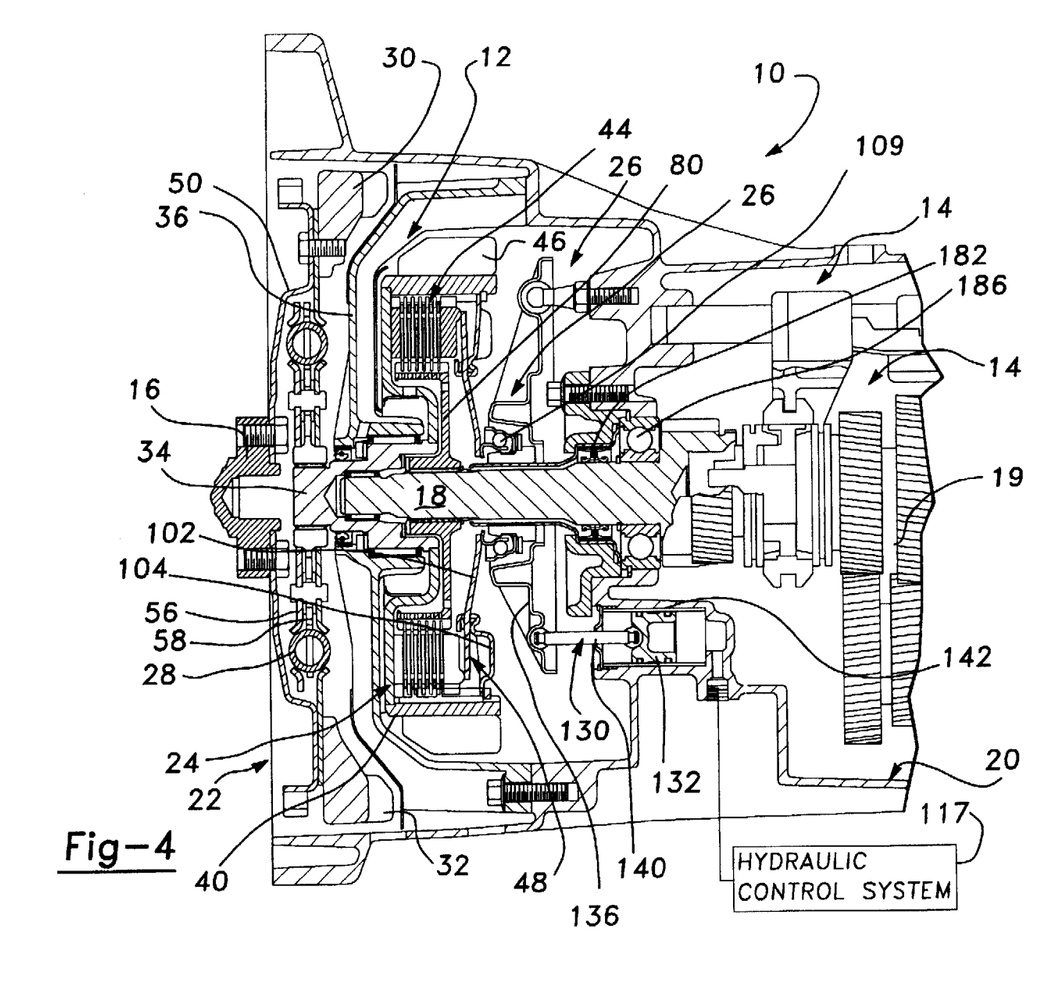
FIG. 4 is a cross-sectional view of the integrated clutch transmission equipped with a clutch release mechanism according to a third embodiment of the present invention.

At this point, it should be noted that FIGS. 3 and 4 illustrate alternative methods of actuating clutch release mechanism 26. In FIGS. 3 and 4, the same reference numerals have been used to represent the same elements as are discussed with reference to FIGS. 1 and 2, and only the components associated with clutch release mechanism 26 have been changed. With reference to FIG. 3, clutch release mechanism 26 is a hydraulically-actuated arrangement including an integral slave actuator 112 which has a series of pistons 114 (one of which is shown) arranged in a circle around transmission input shaft 18 and provided in hydraulic cylinders 116 and which receives a supply of hydraulic fluid under pressure from a remote hydraulic control system, schematically shown at block 117, through a fluid passage 118. Piston 114 is shown to engage an actuator plate 120 which presses against bearing assembly 109 when piston 114 is axially displaced within cylinder 116. A spring member 122 is provided for normally biasing actuator plate 120 to a leftward position (as shown in FIG. 3) with a light load so that bearing 109 remains in contact with diaphragm spring 102 during normal operation in its engaged mode. A guide member 124 is provided for guiding actuating plate member 120 in a consistent manner. Delivery of hydraulic fluid under pressure into cylinder 116 causes forward axial movement of piston 114, actuator plate 120, and bearing assembly 109 for deflecting spring 102 to pivot about pivots 106 and release pressure plate 100 from clutch pack 44. While schematically shown, hydraulic control system 117 can be any arrangement that is operable for controlling the delivery of pressurized fluid to cylinder 116 upon actuation of the foot pedal by the vehicle driver, or by automated means with such equivalent arrangements contemplated to be fairly within the scope of this invention.

With respect to FIG. 4, a concentric release system 130 is provided consisting of an individual piston 132 connected to a hydraulic release system 117. Concentric release system 130 includes release fork actuator member 136 which engages bearing assembly 109. Actuator member 136 is connected by a connector rod 140 to piston 132. Piston 132 is disposed in hydraulic cylinder 142 which is connected to hydraulic release system 117. It should be understood from the above description that the parts of the hydraulic release mechanism can have various configurations. It is thus anticipated that many conventional manual, hydraulic, pneumatic and other electromechanical devices can be utilized in actuating clutch release mechanism 44.

Integrated clutch transmission 10 is designed with several features which will now be described. Integrated clutch transmission 10 is uniquely designed with an air cooling system. As shown in FIG. 2, clutch cover 36 is provided with cooling fins 144 which are disposed on a lower half portion of the damper side of clutch cover 36. Transmission housing 20 is provided with one or more cooling air input openings 146 and one of more cooling air output opening 148. As first inertia member 30 rotates, air impeller 32 rotates therewith. The rotation of air impeller 32 causes air to flow into cooling air input opening 146 and out through cooling air output opening 148. An air partition wall 150 is provided for requiring the cooling air which enters the cooling air input opening 146 to pass along a substantial portion of cooling fins 144 before being exhausted through cooling air output opening 148. Heat is transferred from the oil, which is illustrated in FIG. 2 as having a level represented by a phantom line designated with reference numeral 152 in the bottom of multi-plate wet clutch 24, through clutch cover 36 and into heat conducting cooling fins 144. The cooling air which is drawn through cooling air input opening 146 is heated as it passes along cooling fins 144 and carries the heat away from the transmission as it is exhausted through cooling air output opening 148.

Multi-plate wet clutch 24 is provided with an inside to outside oil flow lubrication system. This lubrication system includes oil 152 through which second inertia ring 46 and outer clutch drum 40 pass during rotation. Oil 152 is then splashed on the inner walls of clutch cover 36. Clutch cover 36 is provided with oil guide fins 158 on an upper portion of the clutch side of clutch cover 36. Oil guide fins 158 guide the oil, which is centrifugally deposited against the walls of the upper portion of clutch cover 36, to the center of multi-plate wet clutch 24. Oil guide fins 158 are provided with an oil partition 160 which defines an oil path 162 which returns the oil to a central cup portion 164 of clutch housing 76. Central cup portion 164 is provided with oil passages 166 which allow oil to flow radially through oil passages 166 and between outer clutch plates 82 and inner clutch plates 84.

Figure 5:
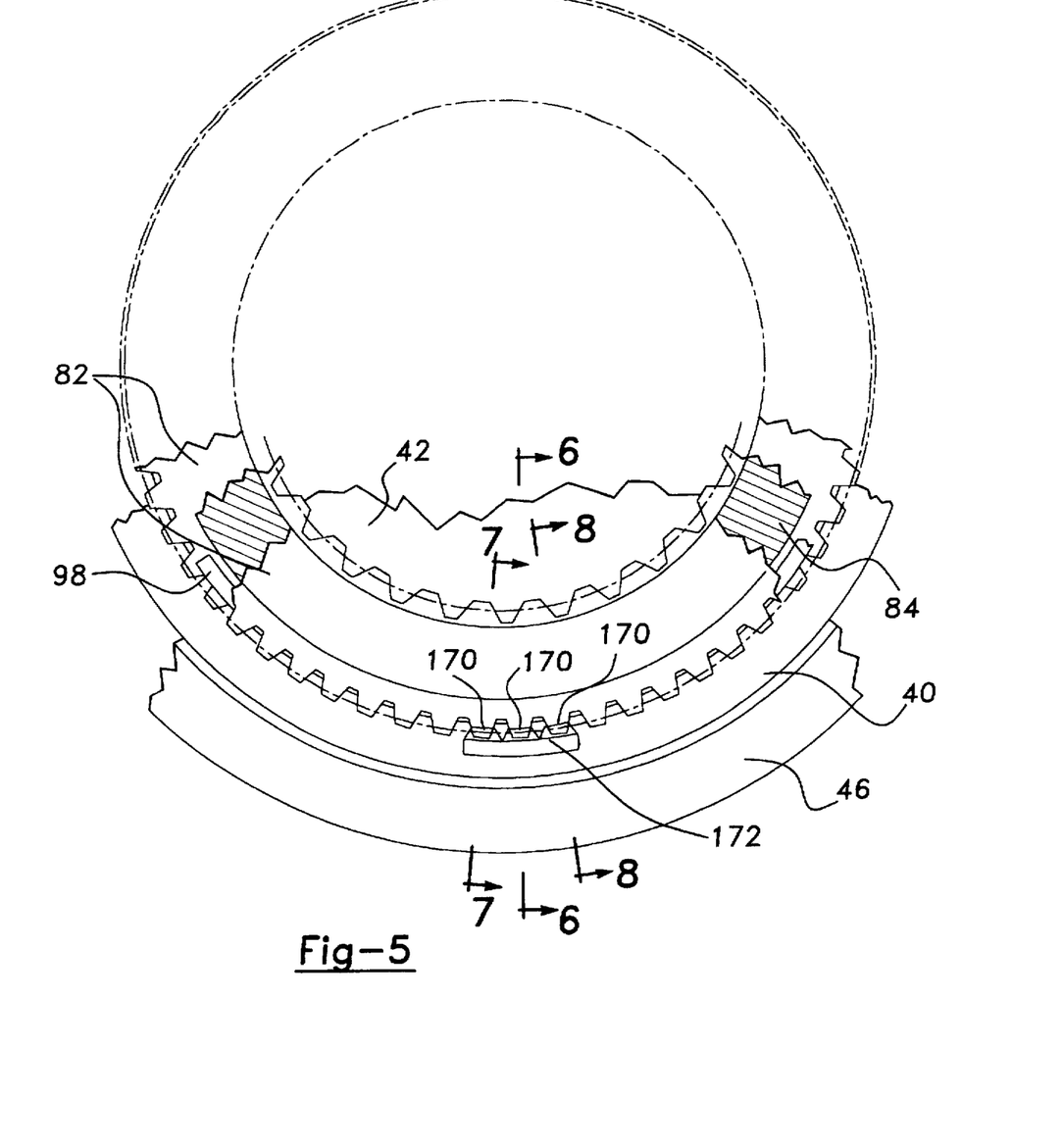
FIG. 5 is an end view of a clutch drive plate stop according to the principles of the present invention.
Figure 9:
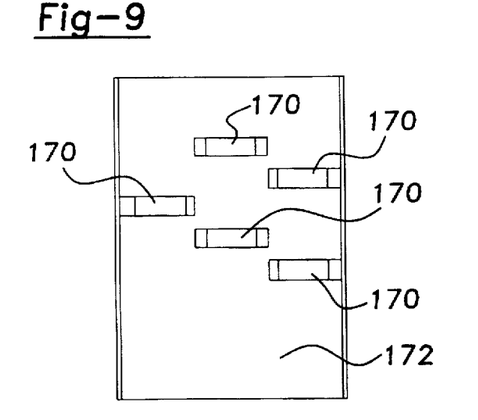
FIG. 9 is a plan view of the clutch drive plate stop according to the principles of the present invention.
Figure 10:
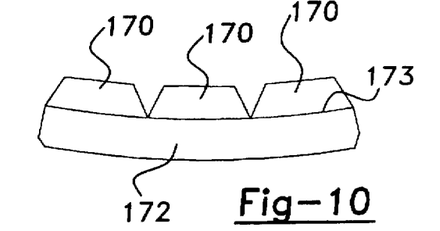
FIG. 10 is an end view of the clutch drive plate stop shown in FIG. 9.
Figure 11:
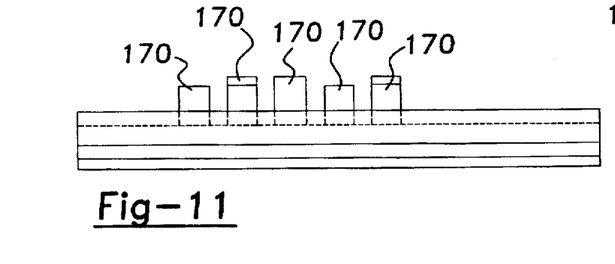
FIG. 11 is a side view of the clutch drive plate stop shown in FIG. 9.

As mentioned earlier, multi-plate wet clutch 24 is provided with separator springs 98 between outer clutch plates 82. Separator springs 98 are of a conventional wave-type design which are designed to provide an even spacing between clutch plates 82 when clutch release mechanism 26 is actuated. In addition, a plurality of clutch plate release stops 170 are provided for limiting the amount of spacing between selected groups of clutch plates 82. Clutch plate release stops 170 extend radially inward from stop plate 172 which is supported by outer clutch drum 40, as shown in FIG. 5. As shown in FIGS. 9–11, stop plate 172 is provided with a plurality of clutch plate release stops 170 on a concave arcuate surface 173 thereof. In the embodiment shown in FIGS. 6A–8B, there are five outer clutch plates 82. Thus, stop plate 172 is preferably provided with five clutch plate release stops 170, one corresponding with each outer clutch plate 82.

Figure 6A:
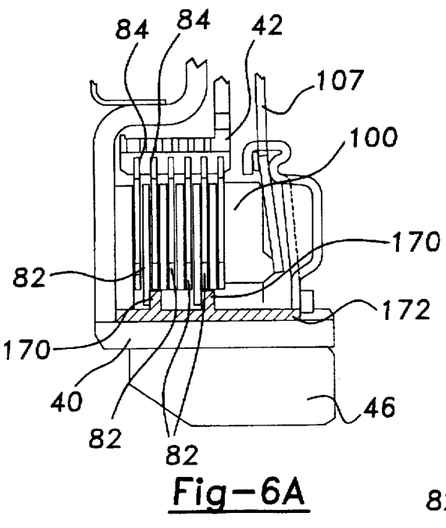
FIG. 6A is a sectional view taken along line 6—6 of FIG. 5 showing the clutch drive plate stop with the clutch disengaged.
Figure 6B:
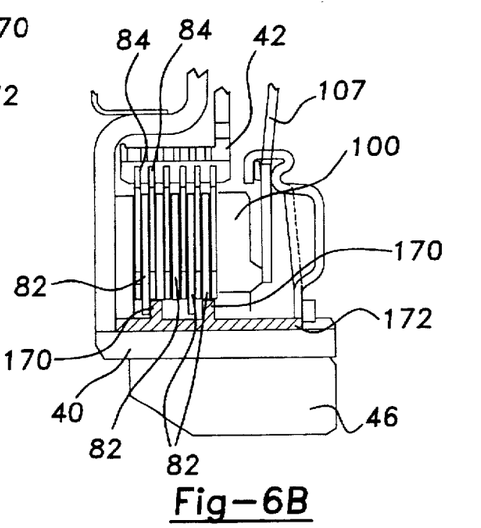
FIG. 6B is a sectional view taken along line 6—6 of FIG. 5 showing the clutch drive plate stop with the clutch engaged.

As shown in the cross-sectional view of FIG. 6A, which is taken along line 6—6 of FIG. 5, two clutch plate release stops 170 are provided for limiting the axial movement of the first and fourth outer clutch plates 82 when wet clutch 24 is disengaged. FIG. 6B shows the same view as in FIG. 6A except wet clutch 24 is engaged such that the first and fourth outer clutch plates 82 are not in contact with the clutch plate release stops 170.

Figure 7A:
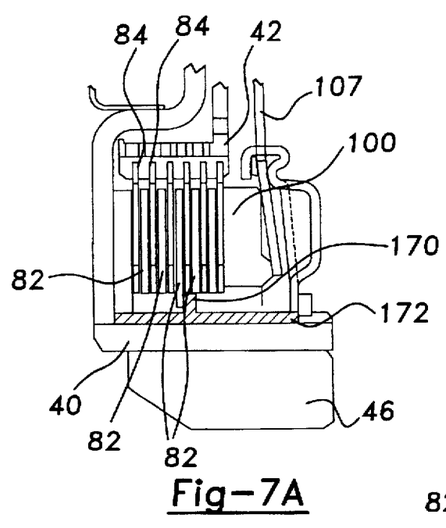
FIG. 7A is a sectional view taken along line 7—7 of FIG. 5 showing the clutch drive plate stop with the clutch disengaged.
Figure 7B:
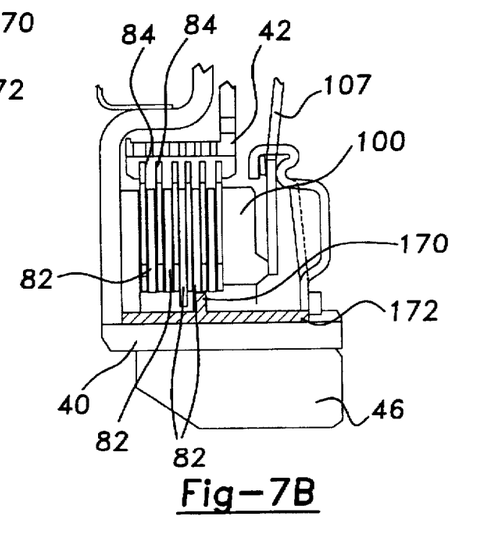
FIG. 7B is a sectional view taken along line 7—7 of FIG. 5 showing the clutch drive plate stop with the clutch engaged.

As shown in the cross-sectional view of FIG. 7A, which is taken along line 7—7 of FIG. 5, one clutch plate release stop 170 is provided for limiting the axial movement of a third outer clutch plate 82 when wet clutch 24 is disengaged. FIG. 7B shows the same view as in FIG. 7A except wet clutch 24 is engaged such that the third outer clutch plate 82 is not in contact with the clutch plate release stop 170.

Figure 8A:
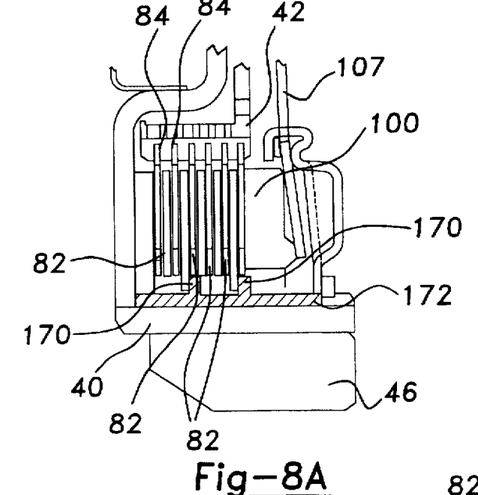
FIG. 8A is a sectional view taken along line 8—8 of FIG. 5 showing the clutch drive plate stop with the clutch disengaged.

As shown in the cross-sectional view of FIG. 8A, which is taken along line 8—8 of FIG. 5, two clutch plate release stops 170 are provided for limiting the axial movement of second and fifth outer clutch plates 82 when wet clutch 24 is disengaged. FIG. 6B shows the same view as in FIG. 6A except wet clutch 24 is engaged such that the second and fifth outer clutch plates 82 are not in contact with the clutch plate release stops 170.

Figure 8B:
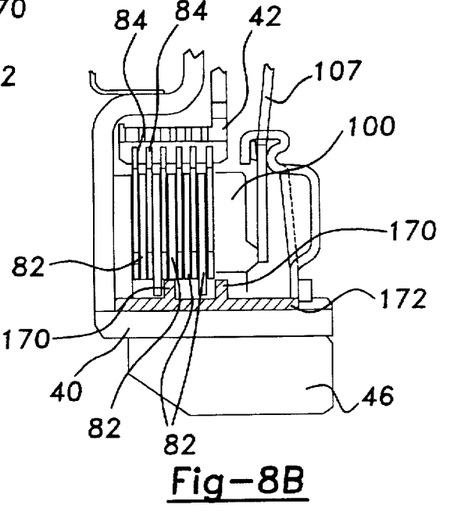
FIG. 8B is a sectional view taken along line 8—8 of FIG. 5 showing the clutch drive plate stop with the clutch engaged.

Release stops 170 are staggered, as described above with respect to FIGS. 6A–11, so as to not inhibit the engagement of outer clutch plates 82 and inner clutch plates 84, while limiting the axial movement of outer clutch plates 82 when clutch release mechanism 26 is actuated so that an even spacing of the plates is obtained in order to minimize drag on clutch plates 82 and 84. The splines on the outer clutch plates 82 which are not designed to engage the clutch plate release stops 170 are truncated so the clutch plates that are capable of freely passing over the release stops 170 during engagement of the clutch. Thus, the release stops 170 do not interfere with the engagement of the inner and outer clutch plates 84, 82, respectively, as shown in FIGS. 6B, 7B and 8B.

It should be noted that clutch cover 36 is mounted to transmission housing 20 by a plurality of bolts 174, one of which is shown. Furthermore, a first end of transmission input shaft 18 is supported by bearings 180 within an axial bore of intermediate shaft 34. A seal 182 is provided on the second end of transmission input shaft 18, as shown in FIG. 1. In addition, the second end of transmission input shaft 18 is supported within transmission housing 20 by bearing 186.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A damper and clutch assembly for installation between a drive shaft and a driven shaft In a manual automotive transmission, comprising:

a damper mechanism coupled to the drive shaft for damping driven rotation thereof;

a wet clutch mechanism for releasably coupling the driven shaft to the drive shaft, said wet clutch mechanism including a plurality of drive plates fixed for rotation with the drive shaft, a plurality of driven plates fixed for rotation with the driven shaft and which are alternately interleaved with said drive plates, and a thrust mechanism movable between a first position whereat a clutch engagement force is exerted on said interleaved drive and driven plates for coupling the driven shaft for rotation with the drive shaft, and a second position permitting relative rotation between said drive plates and said driven plates for releasing the driven shaft from driven rotation with the drive shaft; and a clutch release mechanism for selectively moving said thrust mechanism from said first position to said second position;

wherein said damper mechanism further has a first inertial member connected thereto, and said clutch mechanism has a second inertial mass mounted to a clutch drum of said wet clutch mechanism.

2. The damper and clutch assembly of claim 1 wherein said damper mechanism is operably connected between the drive shaft and an intermediate shaft, and wherein said drive plates of said wet clutch mechanism are fixed for rotation with said intermediate shaft and said driven plates are fixed for rotation with the driven shaft.

3. The damper and clutch assembly of claim 1 wherein said damper mechanism includes a drive plate connected to the drive shaft and a clutch damper having a drive damper plate connected to said drive plate and a driven damper plate connected to said damper drive plate by a plurality of springs.

4. The damper and clutch assembly of claim 1 wherein said thrust mechanism includes a pressure plate adjacent to said interleaved plates, and a spring mechanism for exerting a biasing force against said pressure plate for applying said clutch engagement force to said interleaved plates, and wherein said clutch release mechanism is operable for selectively releasing said biasing force from said pressure plate.

5. The damper and clutch assembly of claim 1 wherein said wet clutch mechanism includes a plurality of springs disposed between said drive plates.

6. The damper and clutch assembly of claim 5 further comprising a plurality of clutch plate stops for limiting the amount of movement of said drive plates and driven plates when said clutch release mechanism is actuated.

7. The damper and clutch assembly of claim 1 further comprising a clutch cover between said damper mechanism and said wet clutch mechanism, said clutch cover including oil guide fins and an oil partition disposed adjacent to said oil guide fins.

8. The damper and clutch assembly of claim 1 further comprising an air impeller attached to said damper mechanism.

9. The damper and clutch assembly of claim 8 further comprising a clutch cover between said damper mechanism and said wet clutch mechanism, said clutch cover including air cooling fins thereon and an air partition adjacent to said air cooling fins for defining an air passage adjacent to said air cooling fins.

10. An integrated clutch transmission, comprising:

a transmission housing;

a drive plate supported within said transmission housing and adapted to be connected to an engine output shaft;

a first inertial ring mounted to said drive plate;

a damper mechanism having a drive damper plate connected to said drive plate and a driven damper plate connected to said damper drive plate by a plurality of springs;

a wet clutch shaft supported for rotation with said housing;

a clutch mechanism having an outer drum drivingly connected to said driven damper plate and to which a set of outer clutch plates are secured, and an inner drum drivingly connected to said clutch shaft and having a plurality of Inner clutch plates that are alternately interleaved with said plurality of outer clutch plates;

a second inertial ring mounted to said outer drum;

a pressure plate adjacent to said wet clutch mechanism;

a spring mechanism for exerting a biasing force on said pressure plate which exerts a clutch engagement force on said interleaved clutch plates for releasably coupling said clutch shaft for rotation with said engine output shaft; and a clutch release mechanism for selectively releasing said biasing force from said pressure plate for permitting relative rotation between said clutch shaft and said engine output shaft.

11. The integrated clutch transmission of claim 10 further comprising a plurality of springs disposed between said outer clutch plates.

12. The integrated clutch transmission of claim 10 further comprising a clutch cover between said damper mechanism and said wet clutch mechanism, said clutch cover including oil guide fins thereon and an oil partition disposed adjacent to said oil guide fins.

13. The integrated clutch transmission of claim 10 further comprising an air impeller attached to said damper mechanism.

14. The integrated clutch transmission of claim 13 further comprising a clutch cover between said damper mechanism and said wet clutch mechanism, said clutch cover including air cooling fins thereon and an air partition adjacent to said air cooling fins for defining an air passage along said air cooling fins.

15. The integrated clutch transmission of claim 10 further comprising a plurality of clutch plate release stops for limiting the amount of movement of said clutch plates when said clutch release mechanism is actuated.

16. The integrated clutch transmission of claim 10 wherein said damper mechanism and said wet clutch mechanism are disposed within said transmission housing which also encloses at least part of a manual shift automotive transmission.

* * * * *